US007918126B2

(12) United States Patent
McStay et al.

(10) Patent No.: US 7,918,126 B2
(45) Date of Patent: Apr. 5, 2011

(54) INTELLIGENT UNDERWATER LEAK DETECTION SYSTEM

(75) Inventors: Daniel McStay, Aberdeenshire (GB); Gordon Shiach, Fife (GB); Aidan Nolan, Fife (GB)

(73) Assignee: FMC Technologies, Inc., Houston, TX (US)

( * ) Notice: Subject to any disclaimer, the term of this patent is extended or adjusted under 35 U.S.C. 154(b) by 793 days.

(21) Appl. No.: 11/861,891

(22) Filed: Sep. 26, 2007

(65) Prior Publication Data

US 2009/0078028 A1 Mar. 26, 2009

(51) Int. Cl.
*G01M 3/04* (2006.01)

(52) U.S. Cl. .......... 73/40

(58) Field of Classification Search .......... 73/40
See application file for complete search history.

(56) References Cited

U.S. PATENT DOCUMENTS 3,703,207 A 11/1972 Horton .......... 166/0.5
4,104,906 A * 8/1978 Oertle .......... 73/104
4,178,512 A 12/1979 Früngel et al. .......... 250/461 R
5,078,006 A * 1/1992 Maresca et al. .......... 73/40.5 R
5,883,815 A * 3/1999 Drakulich et al. .......... 702/51
6,171,025 B1 1/2001 Langner et al. .......... 405/154
6,192,980 B1 2/2001 Tubel et al. .......... 166/65.1
6,255,118 B1 7/2001 Alfano et al. .......... 436/172
6,434,435 B1 8/2002 Tubel et al. .......... 700/30
6,795,798 B2 9/2004 Eryurek et al. .......... 702/188
6,978,210 B1 12/2005 Suter et al. .......... 702/13
7,261,162 B2 * 8/2007 Deans et al. .......... 166/336
7,453,367 B2 * 11/2008 Spaolonzi et al. .......... 340/605
2004/0257264 A1 12/2004 Moeller-Jensen .......... 342/52
2005/0111660 A1 5/2005 Hosoda .......... 380/44
2006/0036403 A1 2/2006 Wegerich et al. .......... 702/183
2006/0191324 A1 * 8/2006 Garabedian et al. .......... 73/40
2008/0011056 A1 * 1/2008 Spaolonzi et al. .......... 73/40
2008/0011057 A1 * 1/2008 Spaolonzi et al. .......... 73/40
2008/0162085 A1 7/2008 Clayton et al. .......... 702/188

FOREIGN PATENT DOCUMENTS

GB 2 382 140 A 11/2001
GB 2 405 467 6/2004
WO WO 99/60247 11/1999
WO WO 2007/020392 2/2007

OTHER PUBLICATIONS

PCT Search Report and Written Opinion from PCT/US2008/073953 dated Dec. 2, 2008.
Barbagelata and Barbagelata, "New Acoustic Leak System Saves Money Offshore," *Pipeline & Gas Journal*, pp. 42, 44, Nov. 2004.
McStay et al., "A multi-capability sensor for hydrocarbons, synthetic based fluids and heavy metals: Applications for environmental monitoring during removal of drill cutting piles," *J. Underwater Technology*, 25:69-75, 2002.
Theakston, "Good Specifications Can Result in Useful Software-Based Leak Detection," *Pipeline & Gas Journal*, Mar. 2004.

* cited by examiner

*Primary Examiner* — Hezron Williams
*Assistant Examiner* — Rodney T Frank
(74) *Attorney, Agent, or Firm* — Williams, Morgan & Amerson, P.c.

(57) ABSTRACT

A subsea leak detection system is disclosed which includes a plurality of subsea leak detection sensors and a leak detection controller adapted to receive leak detection data from the plurality of subsea leak detection sensors and direct the sensing activities of the plurality of subsea leak detection sensors based upon the received leak detection data.

39 Claims, 3 Drawing Sheets

INTELLIGENT UNDERWATER LEAK DETECTION SYSTEM

BACKGROUND OF THE INVENTION

1. Field of the Invention

The present invention is generally directed to the field of detecting leaks from underwater systems, and, more particularly, to an intelligent underwater leak detection system for detecting leaks from subsea systems and structures.

2. Description of the Related Art

There are many existing subsea production systems and structures that are employed in the production of oil and gas from subsea wells. Due to environmental, regulatory and perhaps safety regulations, it is important to be able to readily detect the leakage of undesirable materials from such subsea systems. For example, the detection of leaks of hydrocarbons or hydraulic fluid and/or other chemicals from such underwater systems is very important as it enhances the environmental and operational efficiency of such subsea systems, e.g., subsea hydrocarbon production facilities.

Many techniques have been employed to attempt to detect undesirable leakage of material from such subsea systems. For example, it is known in the prior art to employ acoustic, fluorescence, temperature and gas based measurement systems to detect such leaks. Each of these leak detection methods have their strengths and weaknesses as it relates to detecting leaks. In short, while each of these leak detection methods have applications where they are acceptable, none of them are, individually, capable of efficiently detecting leaks in all applications. In most cases, such leak detection systems are non-permanent in nature in that they are typically used during periodic survey operations. In some cases, however, such systems were permanently positioned subsea adjacent the subsea system being monitored.

The majority of underwater fluorescence, temperature and gas sensors used for leak detection have a very small or limited field of sensing capability. That is, they are essentially point sensors. In the case of temperature and gas sensors, such devices are typically only capable of making measurements at the actual sensing device. Some fluorescence sensors have slightly greater range than temperature or gas sensors, but it is still very limited. For example, FIG. 1 is a schematic depiction of a prior art fluorescence point sensor device 10 with a very small sensing field depicted by the circle 12, e.g., approximately 2 cm. Thus, such fluorescence based systems typically only sense a relatively small volume of water. Other fluorescence sensors, such as those shown in, for example, UK patent application GB 2405467 and U.S. Pat. No. 4,178,512, do have a greater range.

The limited sensing range of prior art fluorescence, temperature and gas based sensors can be detrimental to the detection of leaking materials. For example, employing leak detection sensors with such a limited range means that, in order to be detected, the plume of leaking material has to actually reach such sensors before it can be detected. This means that a very large number of permanent sensors of this nature would need to be employed to effectively monitor an underwater production system. Obviously, deploying a large number of permanent point-type sensors to effectively monitor a subsea facility would be very expensive and would pose a number of practical problems relating to the deployment of such sensors, as well as providing power and data communication with such sensors. Additionally, such fluorescence sensors can, by definition, only detect leaking material that fluoresces, thus making such sensors ineffective for detecting leaking materials such as gas or water.

On the other hand, acoustic based leak detection devices are capable of detecting leaks in a larger area via the noise that may be produced by material leaking from the underwater structures. However, such acoustic system only detect a secondary effect of the leak, i.e., noise. The performance capability of such acoustic systems may be severely restricted in noisy environments. Such acoustic systems are generally not able to precisely locate the source of the leak. Moreover, the acoustic based systems are unable to differentiate between leaking materials.

Temperature sensors are likewise not able to differentiate between leaking materials. Temperature sensors also may have a limited effective range, especially as it relates to the detection of relatively small leaks. On the other hand, gas sensors can differentiate between various leaking materials, but they typically have a very limited range.

The breakage or movement of components of a subsea facility, such as pipes, may provide direct evidence of a leak location or information on potential future leak sites. In some cases, such breakage or movement can be visually observed using video cameras or other like devices. However, typically such visual inspection is accomplished via video cameras during routine surveys, or, in a few instances, via permanently deployed subsea camera systems. In both approaches, the detection of breakage or movement of subsea components, such as pipes, relies on the observational skills of the camera operator. This makes leak detection using systems that employ only such camera based observation highly dependent on the skill, subjective judgment and diligence of the operators of such systems, and generally makes them less desirable for long-term, continuous monitoring of subsea facilities to detect leaks.

The present invention is directed to various devices and methods for solving, or at least reducing the effects of, some or all of the aforementioned problems.

SUMMARY OF THE INVENTION

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one illustrative embodiment, a subsea leak detection system is disclosed which comprises a plurality of subsea leak detection sensors and a leak detection controller adapted to receive leak detection data from the plurality of subsea leak detection sensors and direct the sensing activities of the plurality of subsea leak detection sensors based upon the received leak detection data.

BRIEF DESCRIPTION OF THE DRAWINGS

The invention may be understood by reference to the following description taken in conjunction with the accompanying drawings, in which like reference numerals identify like elements, and in which.

Figure 1:
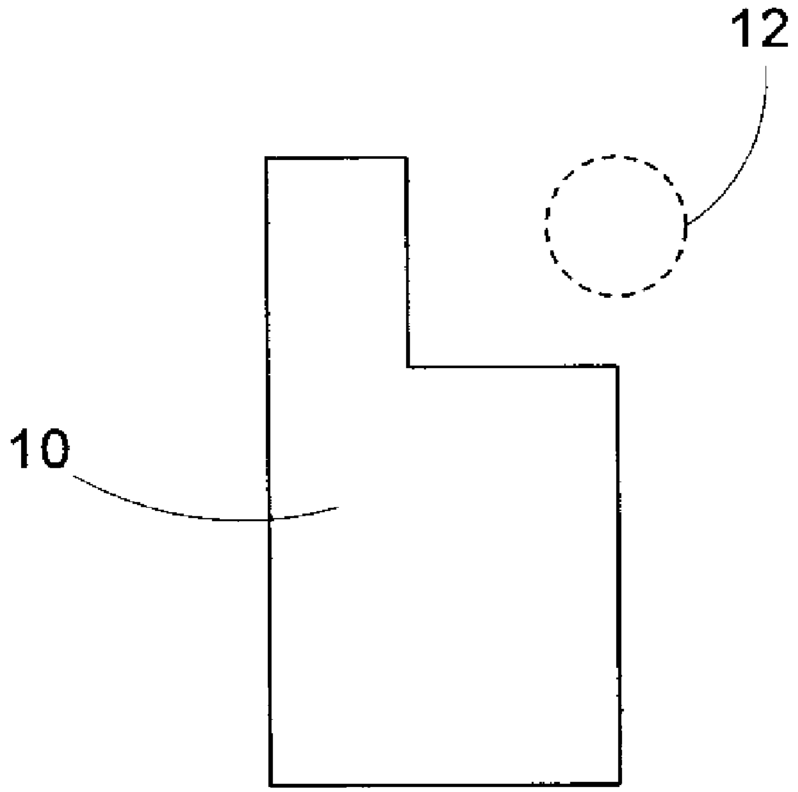
Figure 1 (Prior Art)
FIG. 1 is a simplified schematic depiction of a prior art fluorescence detection device.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Various illustrative embodiments are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
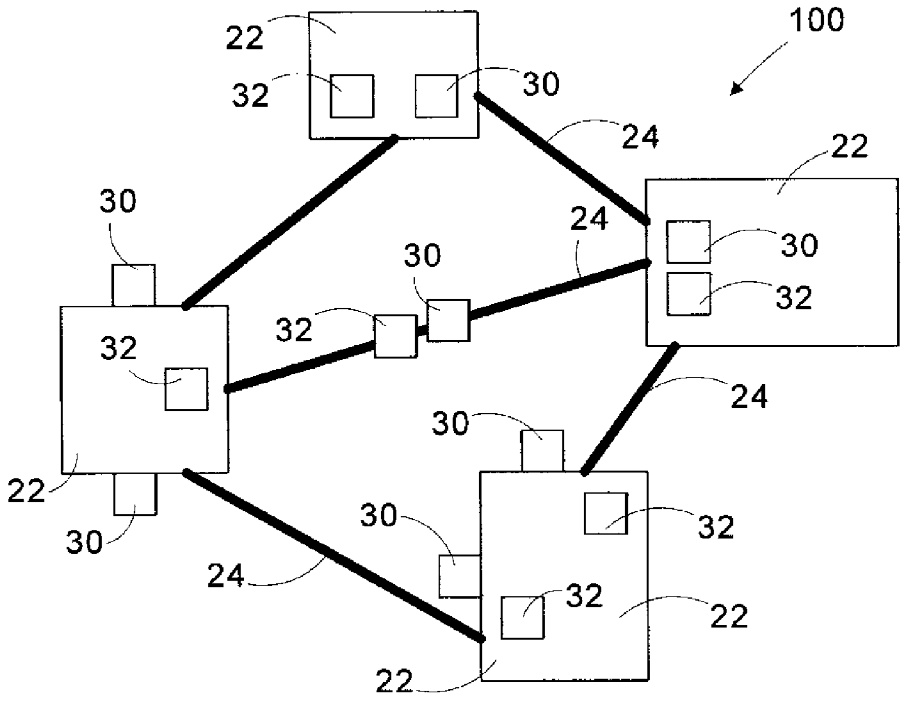
FIG. 2 is a schematic depiction of a subsea facility employing one illustrative embodiment of the leak detection system described herein.

The present disclosure is directed to a system for detecting leakage of undesirable materials, e.g., hydrocarbons, hydraulic fluid, chemicals, etc., from a subsea facility or structure. FIG. 2 is a schematic top view of portions of an illustrative subsea facility 100. As depicted therein, the subsea facility 100 comprises a plurality of subsea components 22 that may have a plurality of interconnecting conduits 24, e.g., pipes, wherein fluids, such as oil and gas, chemicals, etc., may flow between and among the various subsea components 22.

It should be understood that the system 100 depicted in FIG. 2 is intended to be representative in nature in that it may represent any type of subsea facility wherein it is desirable to monitor and detect the leakage of material from the system 100. For example, the illustrative system 100 may be a subsea oil and gas production, drilling or storage facility, etc. Moreover, it should also be understood that the components 22 are intended to be representative of any of a variety of different types of components that may be found or employed in such a subsea facility 100. For example, the illustrative components 22 may be a Christmas tree, a production manifold, a blowout preventer (BOP), a pump, a compressor, processing systems, etc. Thus, as will be recognized by those skilled in the art after a complete reading of the present application, the present invention should not be limited to use with any particular type of system or any type of components of such a system.

As shown in FIG. 2, the system 100 further comprises a plurality of leak detection sensors 30 and cameras 32. The leak detection sensors 30 may be any type of sensor that may be employed to detect the leakage of undesirable materials, e.g., hydrocarbons, chemicals, hydraulic fluids, etc., from the system 100. For example, the plurality of leak detection sensors 30 shown in FIG. 2 may be acoustic sensors, temperature sensors, fluorescence sensors, gas sensors, imaging sensors, etc., or any combination of such sensors. In one illustrative embodiment, a fluorescence sensor like that described in co-pending application Ser. No. 11/845,495, entitled "Fluorescence Measurement System for Detecting Leaks From Subsea Systems and Structures," may be employed with the system described herein. That co-pending application is hereby incorporated by reference in its entirety. The sensors 30 may be arranged in any combination so as to effectively monitor leaks from the system 100.

The number and locations of the sensors 30 and cameras 32 depicted in FIG. 2 is provided by way of example only, as the sensors 30 and cameras 32 may be positioned at any desired location within the system 100. Moreover, it is not required that each leak detection sensor 30 be deployed with an associated camera 32. Rather, the system described herein provides great flexibility as it relates to the number and positioning of the sensors 30 and cameras 32 throughout the system 100 such that leak detection monitoring may be efficiently conducted.

The camera 32 may be any of a variety of different camera systems that are suited for the intended purpose described herein. The camera 32 may be permanently affixed to some portion of the system 100. In some applications, the lens of the camera 32 may be coated with an anti-fouling coating to limit the growth of material, such as algae, on the lens. The growth of such material might adversely impact the ability of the camera 32 to perform its intended function. Similarly, the camera 32 may be provided with a system, such as a wiper, to remove particulate matter or other debris, such as sand, from the lens.

Figure 3:
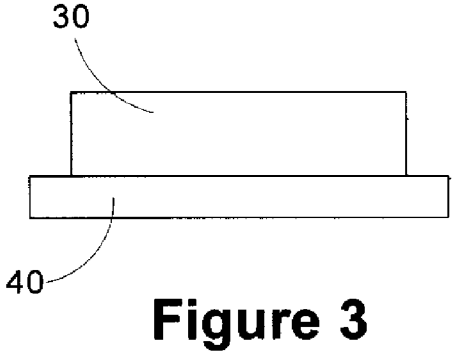
FIG. 3 is a schematic depiction of an illustrative leak detection sensor that may be employed to detect leaks from subsea facilities, as described herein.

In one illustrative embodiment, as shown in FIG. 3, one or more of the leak detection sensors 30 may be mounted on a pan and tilt scanning stage 40 to provide a means to orient one or more of the leak detection sensors 30 toward various desired portions of the system 100. The cameras 32 may also be mounted on such a pan and tilt scanning stage 40. The design, structure and operation of such pan and tilt scanning stages 40 are well known to those skilled in the art. In one particularly illustrative embodiment, all or a majority of the leak detection sensors 30 and the cameras 32 are permanently mounted on various portions 22, 24 of the system 100, and the leak detection sensors 30 and cameras 32 are each mounted on pan and tilt scanning stages 40. Moreover, by mounting the leak detection sensors 30 and/or cameras 32 on pan and tilt scanning stages 40, the true source of the leak may be more readily detected. In some applications, depending upon the number and location of leak detection sensors 30 deployed, it may be possible to use two or more of the leak detection sensors 30 and/or one or more of the cameras 32 to more precisely locate the true source of the leak.

Figure 4:
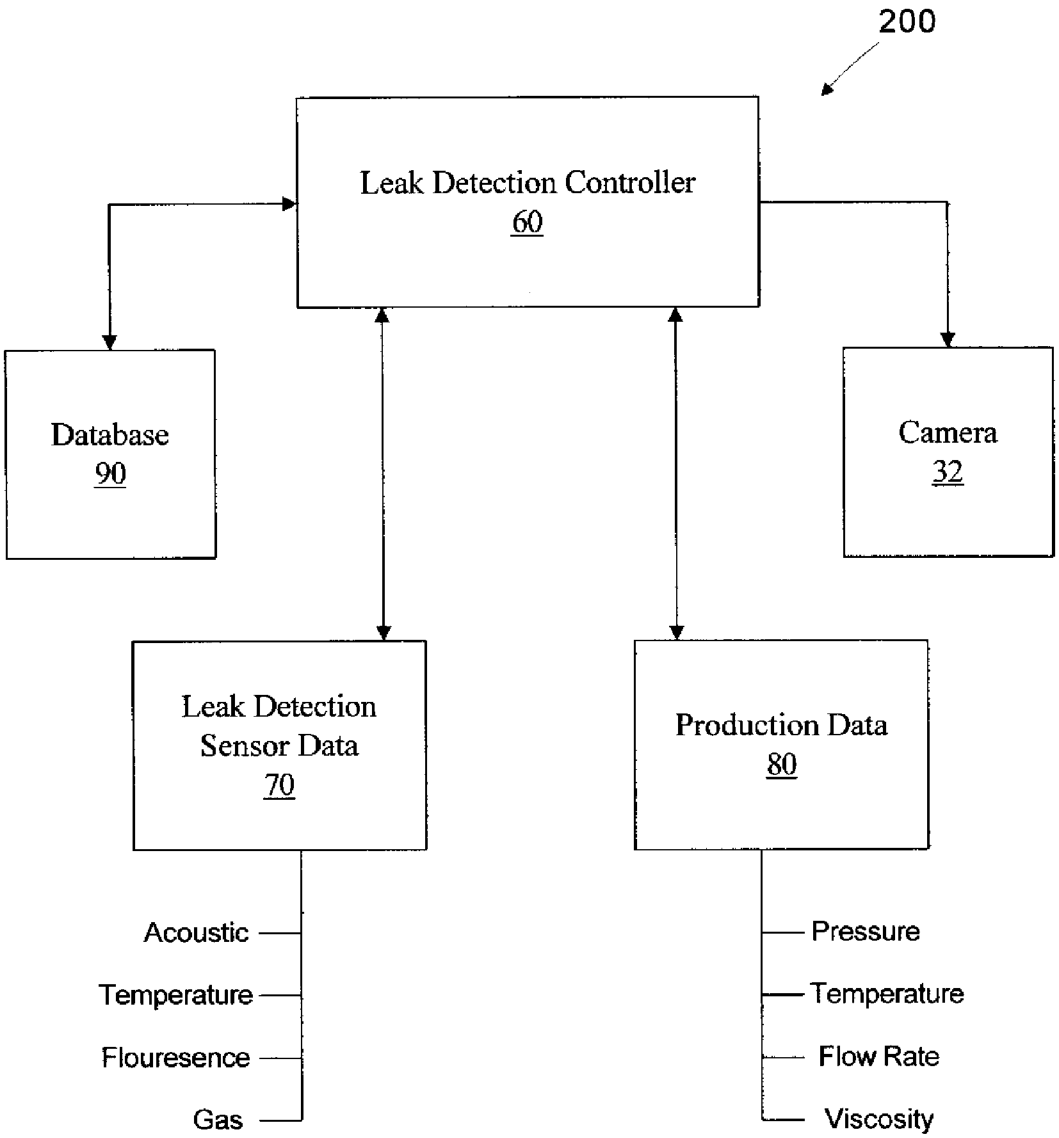
FIG. 4 is a schematic depiction of an illustrative leak detection system described herein.

FIG. 4 is a block level depiction of an illustrative intelligent leak detection system 200 as described herein. As shown therein, the leak detection system 200 comprises at least one leak detection controller 60 that receives leak detection sensor data 70 and may, in some applications, receive additional production data 80. The system 200 may also comprise a database 90 for storing data and/or output from the leak detection controller 60. Of course, the controller 60 depicted in FIG. 4 is representative in nature in that the functions performed by the leak detection controller 60 may be performed by one or more controllers or computers spread throughout a larger computer system. Alternatively, the leak detection controller 60 may be a dedicated resource that is used solely or primarily for purposes of leak detection.

As schematically depicted in FIG. 4, the leak detection controller 60 receives leak detection sensor data 70 obtained by the plurality of leak detection sensors 30 associated with the system 100 depicted in FIG. 2. In the illustrative example described herein, the leak detection sensors 30 may be acoustic based sensors, temperature based sensors, fluorescence based sensors, gas based sensors, image sensors, etc. In further embodiments, the leak detection controller 60 may also receive production data 80 that may be obtained by a variety of known techniques, e.g., from a variety of known sensors employed to monitor various aspects of production from the subsea facility 100 or production process modules. For example, such production data may include the pressure within the system 100 or a component 22, the flow rate of a fluid flowing through the system 100, the temperature of fluid flowing through a component 22 or a conduit 24, and the viscosity of the fluid flowing through the system 100.

The controller 60 has the capability to change a pre-established sensing protocol for the plurality of sensors 30. For example, the controller 60 may modify the frequency of when any of such sensors 30 perform or report the results of such sensing activities, e.g., if initial leak detection data from a sensor is indicative of a leak, the controller 60 may increase the frequency at which it receives leak detection data from the particular sensor. In another example, the controller 60 may modify or change the established sensing protocol of other sensors in the system, e.g., direction, frequency, acceptable ranges of sensed variables, etc., to assist in locating the source of a leak. The controller 60 may also modify such sensing protocols after first determining that the production data 80 confirms that the production system is operating within acceptable limits.

In one illustrative example, the system 200 may be employed to establish "baseline" data for the leak detection sensors 30 in the system 100. This baseline data would be established when the system 100 is operating under normal, approximately steady state conditions. The production data 80 associated with such steady state conditions may also be noted. Once established, the baseline data for each leak detection sensor 30 may be employed to evaluate subsequent data received by a particular leak detection sensor 30 for purposes of determining if the sensed data by the leak detection sensor 30 should be interpreted as indicative of an actual leak or whether there is some other reason for the particular leak detection sensor 30 providing data that varies from its baseline data. For example, an acceptable level of variation between the baseline data and the actual sensed data may be established. If the sensed data does not fall outside of this acceptable level, the system 100 may ignore the sensed data from the leak detection sensor 30. Alternatively, the system 200 may simply categorize such an event as noteworthy and increase the monitoring of the area covered by the particular sensor 30 or increase the sensing frequency of the particular sensor 30.

In the event that the sensed data exceeds an acceptable threshold value, the system 200 may take further actions to confirm that a leak actually exists and/or to confirm that the detected leak is a result of some other condition. For example, the system 200 may direct that other leak detection sensors 30 be engaged or monitored to determine the accuracy of the sensed data reported by the particular leak detection sensor 30. The frequency of the sampling rate may also be increased on the particular sensor 30 as well as for additional sensors 30 adjacent or near the particular sensor 30.

In another example, where the system 200 has the ability to control the direction of the plurality of leak detection sensors 30 within the system, as is the case when the sensors 30 are located on a pan and tilt mechanism 40, the leak detection controller 60 may direct that additional leak detection sensors 30 be directed toward the area or region of the system covered by the reporting sensor 30. That is, the system 200 may direct that all sensors 30 in the immediate vicinity of the reporting sensor 30 be directed toward the area covered by the reporting sensor 30. The controller 60 may then analyze the data from these additional sensors, e.g., relative decibel levels from several zone based sensors, in an effort to more accurately determine the location of the leak. In other cases, fluorescence sensors 30 may be directed toward the area or region of the system 100 in an effort to locate the leak.

In another aspect, the present invention may employ a hierarchical analysis to facilitate leak detection. For example, some sensors, e.g., acoustic sensors, only detect a secondary effect of the leak, e.g., noise. In one example, when the leak detection controller 60 receives data from such a "secondary effect" leak detection sensor 30, the controller 60 may direct that other sensors 30 that directly sense the leaking material, e.g., fluorescence or gas sensors, be directed toward the area of interest as reflected by the data provided by the acoustic sensor. Temperature sensors also may sense a secondary effect of a leak, e.g., a localized increase or decrease in a portion of the system 100 or the adjacent environment. Upon indication of a leak from such a temperature sensor 30, the controller 60 may direct that additional sensors 30, some with direct sensing capability for the leaking material, be directed to the region covered by the reporting temperature sensor 30.

In another illustrative aspect, the controller 60 may analyze production data 90 in the course of performing leak detection analysis. For example, upon receipt of sensor data 70 indicating or suggesting that a leak may have been detected, the controller 60 may monitor the most recent production data and/or direct acquisition of production data to determine what impact, if any, the status of the production facility may have on the reading obtained by the reporting leak detection sensor 30. For example, if the production data reflects that the system 100 is operating in a non-steady state or upset condition, the system 200 may ignore the data received by the reporting leak detection sensor 30, or at least indicate to a human operator that the data from the reporting leak detection sensor 30 may be based, at least in part, on the non-steady state operating condition of the system 100 as reflected by the production data.

In a more specific example, the controller 60 may note the production data associated when a leak detection sensor 30 reports a value that is outside of a preselected allowable range, and therefore indicative of a leak within the system 100. Based upon an analysis of such information, over time, the controller 60 may be able to identify or suggest a potential cause of any detected leaks. For example, assume that a fluorescence leak detection sensor 30 indicates a leak, and that the pressure within the system 100 is higher than its normal operating pressure, or even on the upper end of an allowable operating range. In response, the controller 60 may report that the allowable operating pressure of the system 100 needs to be decreased and/or that the equipment, e.g., flanges associated with the piping and/or pump, needs to be able to better withstand the pressure sometimes seen at such components. Of course, human intervention will be required to make final decisions with respect to what corrective actions are to be undertaken.

In all cases above, upon receipt of data reflecting or suggesting a leak in the system 100, the controller 60 may direct that one or more cameras 32 within the system 100 be directed toward the area or region of the system 100 that is under investigation.

The controller 60 may employ any of a variety of known computer modelling techniques to facilitate the analysis described here. The exact configuration and parameters of such models may depend upon the particular application and the desired monitoring capabilities of the system 100.

In the illustrated embodiment, the controller 60 is a computer programmed with software to implement the functions described herein. Moreover, the functions described for the controller 60 may be performed by one or more controllers spread throughout a computer system. The controller 60 may be a stand-alone device, or it may reside on one or more of complex computer systems. However, as will be appreciated by those of ordinary skill in the art, a hardware controller designed to implement the particular functions may also be used.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the actions and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The particular embodiments disclosed above are illustrative only, as the invention may be modified and practiced in different but equivalent manners apparent to those skilled in the art having the benefit of the teachings herein. For example, the process steps set forth above may be performed in a different order or the various components stacked and assembled in different configurations. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A subsea leak detection system, comprising:

a plurality of subsea leak detection sensors; and a leak detection controller adapted to receive leak detection data from said plurality of subsea leak detection sensors and direct the sensing activities of said plurality of subsea leak detection sensors based upon said received leak detection data, and wherein said leak detection controller is adapted to receive production data regarding operation of a subsea facility monitored by said plurality of leak detection sensors and compare leak detection data received from at least one of said plurality of sensors to a baseline established for said at least one of said plurality of leak detection sensors and compare leak detection data received from at least one of said plurality of sensors to a baseline established for said at least one of said plurality of leak detection sensors.

2. The system of claim 1, further comprising a database for storing said leak detection data received from said plurality of leak detection sensors.

3. The system of claim 1, wherein said controller may change pre-established sensing protocols if said received leak detection sensor data is outside of a preselected allowable range.

4. The system of claim 1, wherein said controller may change pre-established sensing protocols if said received leak detection sensor data is outside of a preselected allowable range and said production data is within an allowable range.

5. The system of claim 1, wherein said leak detection controller, upon receipt of leak detection data indicative of a leak from any of said plurality of leak detection sensors, is adapted to direct at least one additional sensor of said plurality of subsea sensors to perform sensing activities to detect the source of said leak.

6. A subsea leak detection system, comprising:

a plurality of subsea leak detection sensors;

a leak detection controller adapted to receive leak detection data from said plurality of subsea leak detection sensors and direct the sensing activities of said plurality of subsea leak detection sensors based upon said received leak detection data, wherein said leak detection controller is adapted to receive production data regarding operation of a subsea facility monitored by said plurality of leak detection sensors and wherein said controller may change pre-established sensing protocols if said received leak detection sensor data is outside of a preselected allowable range; and at least one camera that may be directed by said leak detection controller to observe a particular region based upon said received leak detection data.

7. The system of claim 6, further comprising a database for storing said leak detection data received from said plurality of leak detection sensors.

8. The system of claim 6, wherein said controller is adapted to compare leak detection data received from at least one of said plurality of sensors to a baseline established for said at least one of said plurality of leak detection sensors.

9. The system of claim 6, wherein said controller may change pre-established sensing protocols if said received leak detection sensor data is outside of a preselected allowable range and said production data is within an allowable range.

10. The system of claim 6, wherein said leak detection controller, upon receipt of leak detection data indicative of a leak from any of said plurality of leak detection sensors, is adapted to direct at least one additional sensor of said plurality of subsea sensors to perform sensing activities to detect the source of said leak.

11. A subsea leak detection system, comprising:

a plurality of subsea leak detection sensors; and a leak detection controller adapted to receive leak detection data from said plurality of subsea leak detection sensors and direct the sensing activities of said plurality of subsea leak detection sensors based upon said received leak detection data, wherein said leak detection controller is adapted to receive production data regarding operation of a subsea facility monitored by said plurality of leak detection sensors, and wherein said leak detection controller, upon receipt of leak detection data indicative of a leak from any of said plurality of leak detection sensors, is adapted to direct at least one additional sensor of said plurality of subsea sensors to perform sensing activities to detect the source of said leak, and wherein said controller is adapted to compare leak detection data received from at least one of said plurality of sensors to a baseline established for said at least one of said plurality of leak detection sensors.

12. The system of claim 11, further comprising at least one camera that may be directed by said leak detection controller to observe a particular region based upon said received leak detection data.

13. The system of claim 11, further comprising a database for storing said leak detection data received from said plurality of leak detection sensors.

14. The system of claim 11, wherein said controller may change pre-established sensing protocols if said received leak detection sensor data is outside of a preselected allowable range.

15. The system of claim 11, wherein said controller may change pre-established sensing protocols if said received leak detection sensor data is outside of a preselected allowable range and said production data is within an allowable range.

16. A subsea leak detection system, comprising:

a plurality of subsea leak detection sensors;

a leak detection controller adapted to receive leak detection data from said plurality of subsea leak detection sensors and direct the sensing activities of said plurality of subsea leak detection sensors based upon said received leak detection data, wherein said leak detection controller, upon receipt of leak detection data indicative of a leak from any of said plurality of leak detection sensors, is adapted to direct at least one additional sensor of said plurality of subsea sensors to perform sensing activities to detect the source of said leak and wherein said controller is adapted to compare leak detection data received from at least one of said plurality of sensors to a baseline established for said at least one of said plurality of leak detection sensors; and at least one camera that may be directed by said leak detection controller to observe a particular region based upon said received leak detection data.

17. The system of claim 16, further comprising a database for storing said leak detection data received from said plurality of leak detection sensors.

18. The system of claim 16, wherein said controller may change pre-established sensing protocols if said received leak detection sensor data is outside of a preselected allowable range.

19. The system of claim 16, wherein said controller may change pre-established sensing protocols if said received leak detection sensor data is outside of a preselected allowable range and said production data is within an allowable range.

20. A subsea leak detection system, comprising:

a plurality of subsea leak detection sensors;

a leak detection controller adapted to receive leak detection data from said plurality of subsea leak detection sensors and direct the sensing activities of said plurality of subsea leak detection sensors based upon said received leak detection data, wherein said controller is adapted to compare leak detection data received from at least one of said plurality of sensors to a baseline established for said at least one of said plurality of leak detection sensors; and a database for storing said leak detection data received from said plurality of leak detection sensors.

21. The system of claim 20, wherein said controller may change pre-established sensing protocols if said received leak detection sensor data is outside of a preselected allowable range.

22. A subsea leak detection system, comprising:

a plurality of subsea leak detection sensors; and a leak detection controller adapted to receive leak detection data from said plurality of subsea leak detection sensors and direct the sensing activities of said plurality of subsea leak detection sensors based upon said received leak detection data, wherein said controller is adapted to compare leak detection data received from at least one of said plurality of sensors to a baseline established for said at least one of said plurality of leak detection sensors.

23. The system of claim 22, wherein said controller may change pre-established sensing protocols if said received leak detection sensor data is outside of a preselected allowable range.

24. The system of claim 22, wherein said leak detection controller, upon receipt of leak detection data indicative of a leak from any of said plurality of leak detection sensors, is adapted to direct at least one additional sensor of said plurality of subsea sensors to perform sensing activities to detect the source of said leak.

25. A subsea leak detection system, comprising:

a plurality of subsea leak detection sensors; and a leak detection controller adapted to receive leak detection data from said plurality of subsea leak detection sensors and direct the sensing activities of said plurality of subsea leak detection sensors based upon said received leak detection data, wherein said leak detection controller, upon receipt of leak detection data indicative of a leak from any of said plurality of leak detection sensors, is adapted to direct at least one additional sensor of said plurality of subsea sensors to perform sensing activities to detect the source of said leak, wherein said controller may change pre-established sensing protocols if said received leak detection sensor data is outside of a preselected allowable range.

26. A subsea leak detection system, comprising:

a plurality of subsea leak detection sensors;

a leak detection controller adapted to receive leak detection data from said plurality of subsea leak detection sensors and direct the sensing activities of said plurality of subsea leak detection sensors based upon said received leak detection data, wherein said controller is adapted to compare leak detection data received from at least one of said plurality of sensors to a baseline established for said at least one of said plurality of leak detection sensors, and wherein said leak detection controller, upon receipt of leak detection data indicative of a leak from any of said plurality of leak detection sensors, is adapted to direct at least one additional sensor of said plurality of subsea sensors to perform sensing activities to detect the source of said leak; and a database for storing said leak detection data received from said plurality of leak detection sensors.

27. A subsea leak detection system, comprising:

a plurality of subsea leak detection sensors; and a leak detection controller adapted to receive leak detection data from said plurality of subsea leak detection sensors and direct the sensing activities of said plurality of subsea leak detection sensors based upon said received leak detection data, wherein said leak detection controller is adapted to receive production data regarding operation of a subsea facility monitored by said plurality of leak detection sensors and compare leak detection data received from at least one of said plurality of sensors to a baseline established for said at least one of said plurality of leak detection sensors and wherein said controller may change pre-established sensing protocols if said received leak detection sensor data is outside of a preselected allowable range.

28. The system of claim 27, wherein said controller may change pre-established sensing protocols if said received leak detection sensor data is outside of a preselected allowable range and said production data is within an allowable range.

29. A subsea leak detection system, comprising:

a plurality of subsea leak detection sensors; and a leak detection controller adapted to receive leak detection data from said plurality of subsea leak detection sensors and direct the sensing activities of said plurality of subsea leak detection sensors based upon said received leak detection data, wherein said leak detection controller is adapted to receive production data regarding operation of a subsea facility monitored by said plurality of leak detection sensors and compare leak detection data received from at least one of said plurality of sensors to a baseline established for said at least one of said plurality of leak detection sensors and wherein said controller may change pre-established sensing protocols if said received leak detection sensor data is outside of a preselected allowable range and said production data is within an allowable range.

30. A subsea leak detection system, comprising:

a plurality of subsea leak detection sensors;

a leak detection controller adapted to receive leak detection data from said plurality of subsea leak detection sensors and direct the sensing activities of said plurality of subsea leak detection sensors based upon said received leak detection data, wherein said leak detection controller is adapted to receive production data regarding operation of a subsea facility monitored by said plurality of leak detection sensors, wherein said controller is adapted to compare leak detection data received from at least one of said plurality of sensors to a baseline established for said at least one of said plurality of leak detection sensors and wherein said controller is adapted to compare leak detection data received from at least one of said plurality of sensors to a baseline established for said at least one of said plurality of leak detection sensors; and at least one camera that may be directed by said leak detection controller to observe a particular region based upon said received leak detection data.

31. The system of claim 30, wherein said controller may change pre-established sensing protocols if said received leak detection sensor data is outside of a preselected allowable range and said production data is within an allowable range.

32. A subsea leak detection system, comprising:

a plurality of subsea leak detection sensors;

a leak detection controller adapted to receive leak detection data from said plurality of subsea leak detection sensors and direct the sensing activities of said plurality of subsea leak detection sensors based upon said received leak detection data, wherein said leak detection controller is adapted to receive production data regarding operation of a subsea facility monitored by said plurality of leak detection sensors and wherein said controller may change pre-established sensing protocols if said received leak detection sensor data is outside of a preselected allowable range and said production data is within an allowable range; and at least one camera that may be directed by said leak detection controller to observe a particular region based upon said received leak detection data.

33. A subsea leak detection system, comprising:

a plurality of subsea leak detection sensors; and a leak detection controller adapted to receive leak detection data from said plurality of subsea leak detection sensors and direct the sensing activities of said plurality of subsea leak detection sensors based upon said received leak detection data, wherein said leak detection controller is adapted to receive production data regarding operation of a subsea facility monitored by said plurality of leak detection sensors, and wherein said leak detection controller, upon receipt of leak detection data indicative of a leak from any of said plurality of leak detection sensors, is adapted to direct at least one additional sensor of said plurality of subsea sensors to perform sensing activities to detect the source of said leak, and wherein said controller may change pre-established sensing protocols if said received leak detection sensor data is outside of a preselected allowable range.

34. The system of claim 33, wherein said controller may change pre-established sensing protocols if said received leak detection sensor data is outside of a preselected allowable range and said production data is within an allowable range.

35. A subsea leak detection system, comprising:

a plurality of subsea leak detection sensors;

a leak detection controller adapted to receive leak detection data from said plurality of subsea leak detection sensors and direct the sensing activities of said plurality of subsea leak detection sensors based upon said received leak detection data, wherein said leak detection controller, upon receipt of leak detection data indicative of a leak from any of said plurality of leak detection sensors, is adapted to direct at least one additional sensor of said plurality of subsea sensors to perform sensing activities to detect the source of said leak, and wherein said controller may change pre-established sensing protocols if said received leak detection sensor data is outside of a preselected allowable range; and at least one camera that may be directed by said leak detection controller to observe a particular region based upon said received leak detection data.

36. The system of claim 35, wherein said controller may change pre-established sensing protocols if said received leak detection sensor data is outside of a preselected allowable range and said production data is within an allowable range.

37. A subsea leak detection system, comprising:

a plurality of subsea leak detection sensors;

a leak detection controller adapted to receive leak detection data from said plurality of subsea leak detection sensors and direct the sensing activities of said plurality of subsea leak detection sensors based upon said received leak detection data, wherein said controller may change pre-established sensing protocols if said received leak detection sensor data is outside of a preselected allowable range; and a database for storing said leak detection data received from said plurality of leak detection sensors.

38. The system of claim 37, wherein said leak detection controller, upon receipt of leak detection data indicative of a leak from any of said plurality of leak detection sensors, is adapted to direct at least one additional sensor of said plurality of subsea sensors to perform sensing activities to detect the source of said leak.

39. A subsea leak detection system, comprising:

a plurality of subsea leak detection sensors;

a leak detection controller adapted to receive leak detection data from said plurality of subsea leak detection sensors and direct the sensing activities of said plurality of subsea leak detection sensors based upon said received leak detection data, wherein said leak detection controller, upon receipt of leak detection data indicative of a leak from any of said plurality of leak detection sensors, is adapted to direct at least one additional sensor of said plurality of subsea sensors to perform sensing activities to detect the source of said leak; and a database for storing said leak detection data received from said plurality of leak detection sensors.

* * * * *

UNITED STATES PATENT AND TRADEMARK OFFICE

CERTIFICATE OF CORRECTION

PATENT NO. : 7,918,126 B2
APPLICATION NO. : 11/861891
DATED : April 5, 2011
INVENTOR(S) : Daniel McStay, Gordon Shiach and Aidan Nolan It is certified that error appears in the above-identified patent and that said Letters Patent is hereby corrected as shown below:

Col. 8, lines 17-20 (claim 1, lines 13-16), delete "and compare leak detection data received from at least one of said plurality of sensors to a baseline established for said at least one of said plurality of leak detection sensors".

Column 11, lines 56-60 (claim 30, lines 13-17), delete "and wherein said controller is adapted to compare leak detection data received from at least one of said plurality of sensors to a baseline established for said at least one of said plurality of leak detection sensors".

Signed and Sealed this
Thirty-first Day of May, 2011

David J. Kappos
*Director of the United States Patent and Trademark Office*